United States Patent [19]

Sonoda et al.

[11] 4,396,954

[45] Aug. 2, 1983

[54] STILL MADE VIDEO SIGNAL REPRODUCING APPARATUS

[75] Inventors: Masakazu Sonoda; Hiroyuki Kaimai; Masaaki Komatsu, all of Tokyo, Japan

[73] Assignee: Sony Corporation, Tokyo, Japan

[21] Appl. No.: 236,198

[22] Filed: Feb. 20, 1981

[30] Foreign Application Priority Data

Feb. 20, 1980 [JP] Japan .................................. 55-19958

[51] Int. Cl.³ .............................................. H04N 5/76
[52] U.S. Cl. ..................................... 360/10.3; 360/21;
360/33.1; 360/64; 360/71
[58] Field of Search ....................... 360/10, 21, 33, 64,
360/70, 71, 75, 84, 74.1, 10.1, 10.3, 33.1;
358/127, 312, 335; 318/685, 696, 86

[56] References Cited

U.S. PATENT DOCUMENTS

| | | | |
|---|---|---|---|
| 4,190,869 | 2/1980 | Ota | 360/10.2 |
| 4,197,562 | 4/1980 | Kikuya | 360/64 |
| 4,306,255 | 12/1981 | Misaki | 360/10.3 |
| 4,322,755 | 3/1982 | Kosaka | 360/10.3 |

*Primary Examiner*—Alan Faber
*Attorney, Agent, or Firm*—Lewis H. Eslinger; Alvin Sinderbrand

[57] ABSTRACT

In an apparatus which reproduces video signals from oblique tracks successively formed on a tape, there are provided at least two main rotary heads having different azimuth angles with respect to each other an auxiliary rotary head having the same azimuth angle as that of one of the main rotary heads and which is disposed to substantially scan the same track as that scanned by the one of the main rotary heads. A tape driving circuit for slow motion reproduction of the recorded video signals in which the tape is intermittently driven by an amount corresponding to a predetermined number of the tracks during each of a plurality of predetermined time intervals, and a head control circuit for controlling the operation of the main rotary heads and the auxiliary head in response to the tape driving circuit and head changeover pulses such that when the tape is stopped, the video signals are alternately reproduced by the one of the main rotary heads and the auxiliary rotary head, and the video signals are alternately reproduced by the two main rotary heads during movement of the tape.

7 Claims, 29 Drawing Figures

FIG.3(III)
PRIOR ART

FIG. 4(III)

FIG. 9A (RFSW)

FIG. 9E (PB.CTL)

FIG. 9F (CTL)

STILL MADE VIDEO SIGNAL REPRODUCING APPARATUS

BACKGROUND OF THE INVENTION

1. Field of the Invention

The present invention relates to a video signal reproducing apparatus, and more particularly is directed to an apparatus for reproducing video signals recorded on a tape in a manner such that slow-motion reproduction can be carried out without guard-band noise.

2. Description of the Prior Art

In a helical scan type video recording and reproducing apparatus, video signals are successively recorded by two rotating heads on a magnetic tape in record tracks extending obliquely with respect to the longitudinal direction of the tape. Usually, the two rotating heads have different azimuth angles to achieve high density recording, in which adjacent tracks of the tape are in an abutting or partially overlapping relation to each other. In this regard, cross-talk signals from adjacent tracks can be effectively reduced as a result of azimuth loss of the heads.

For slow motion reproduction of these recorded video signals, the tape is driven at a speed which is slower than that used in the recording mode (or normal reproducing mode). Accordingly, during reproduction, the rotating heads repeatedly trace the respective tracks a number of times, whereby the reproduced picture has a slower motion than it would have if reproduced in a normal reproducing mode. In this manner slow-motion reproduction is achieved. Moreover, when the tape is stopped, a single track is repeatedly traced by the rotating heads to reproduce a still picture.

In the slow-motion reproducing mode or the still picture reproducing mode, the rotating heads rotate at the same speed as in the normal reproduction mode, while the tape is driven at a speed slower than that in the normal reproducing mode or is even stopped completely. As a result, the inclination angle of the track traced by the rotating head on the tape in the slow-motion and still picture reproduction modes differs from the inclination angle of the track in the recording mode (or normal reproducing mode), and this difference in inclination gives rise to tracking deviation.

During reproduction, when one of the rotating heads having one azimuth angle deviates from the track to be scanned and crosses an adjacent track which has been recorded by other rotating head having another azimuth angle, a noise bar is generated in the reproduced picture.

In order to overcome the above-described disadvantage, an improved system, has been proposed as described in U.S. Pat. No. 4,190,869, in which the tape is intermittently driven or shifted by controlling a motor to intermittently drive a capstan. When movement of the tape is stopped, the same tracks are scanned a number of times by the rotating heads each having an azimuth angle corresponding to the track to be scanned, whereby still reproduction is achieved. On the other hand, when the tape is moved at normal speed, normal reproduction is carried out by the rotating heads. Thus, slow-motion reproduction is performed as a combination of still and normal reproduction. It should be noted that the number of fields reproduced from the same track during the still reproduction part of the operation depends on the slow-motion speed.

With the above apparatus, even if one of the rotating heads having one azimuth angle does not cross the adjacent or wrong track recorded by the other rotating head having a different azimuth angle, the one rotating head sometimes traces a large portion of the adjacent or wrong track because of the inclination difference between the record track angle and the head scanning angle. This results in a reduction of the reproduced signal level, causing a lowering of the signal to noise ratio of the reproduced signal and a consequent deterioration of the reproduced picture.

SUMMARY OF THE INVENTION

Accordingly, it is an object of this invention to provide an improved video signal reproducing apparatus which overcomes the above-described problem encountered with the prior art.

It is another object of this invention to provide a novel apparatus for reproducing a slow-motion picture from a video signal recorded on a tape, with a high signal to noise ratio.

In accordance with an aspect of this invention, an apparatus for reproducing video signals recorded on tracks which are obliquely formed on a tape, includes at least two main rotary heads having different azimuth angles with respect to each other for scanning said tracks; an auxiliary rotary head having the same azimuth angle as that of one of the main rotary heads, the auxiliary rotary head being disposed to substantially scan the same track as that scanned by the one of the main rotary heads; tape driving means for intermittently driving the tape by an amount corresponding to a predetermined number of the tracks during each of a plurality of predetermined time intervals; and head control means for controlling the operation of the main rotary heads and the auxiliary rotary head such that the video signals are reproduced by the one of the main rotary heads and the auxiliary rotary head when the tape is stopped, and the video signals are reproduced by the main rotary heads during movement of the tape.

The above and other objects, features and advantages of this invention, will be apparent from the following detailed description of an illustrative embodiment of the invention which is to be read in connection with the accompanying drawings.

DETAILED DESCRIPTION OF A PREFERRED EMBODIMENT

Referring to the drawings in detail, and initially to FIGS. 1–3 thereof, various problems associated with the prior art will first be described before discussing the present invention.

Figure 1:
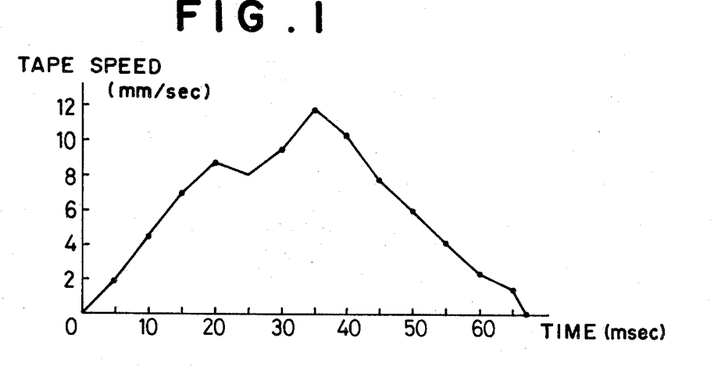
FIG. 1 is a graphical diagram showing the tape speed of a video tape recorder (VTR) when the tape is fed intermittently for reproducing a slow motion picture.
Figure 2:
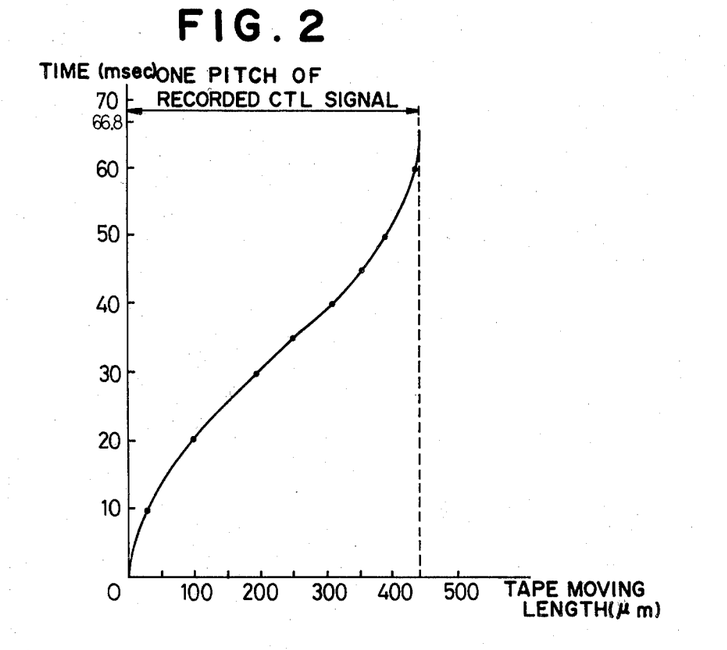
FIG. 2 is a graphical diagram showing the amount of tape transportation during an intermittent feed operation.

FIG. 1 is a graph showing the tape speed of a known video tape recorder (VTR) when the tape is fed intermittently for reproducing a slow motion picture and FIG. 2 is a graph showing the amount of tape transportation during such intermittent tape feed operation. During slow-motion playback, intermittent drive pulses are applied to the capstan motor of the VTR, and, as shown in FIG. 1, the magnetic tape travels during a period of about 67 ms for each pulse. During the feed period, the tape is transported by a length corresponding to one pitch of the control (CTL) signals (1 frame=2 track interval) recorded at the side of the tape, as shown in FIG. 2. The tape feed rate is substantially equal to the normal playback speed so that the skew angle of the scanning path substantially coincides with that of the recording track, and a picture devoid of a noise bar or noise band can be reproduced by a television receiver. The drive pulses supplied to the capstan motor for tape transportation are produced in synchronization with both of the rotational phase pulses, hereinafter called PG (Pulse Generator) pulses, derived from the rotary magnetic head assembly, and the reproduced control signal, hereinafter called the CTL signal, reproduced from the control track. Accordingly, the tape can be stopped at positions where the scanning path substantially coincides with the recording track on the tape, In this manner the head does not cross a track having a different azimuth track during the still picture reproduction mode following each intermittent tape feed.

Slow-motion playback at an arbitrary rate is carried out by setting the number of intermittent tape feed operations per unit time or by setting the interval of the intermittent tape feed.

Figure 3:
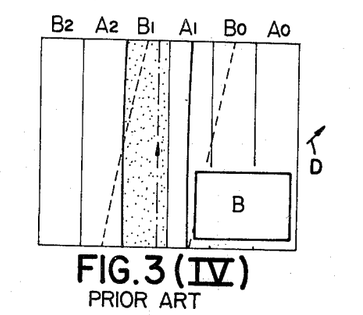
Figure 3I:
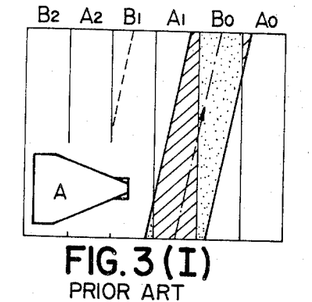
FIGS. 3(I)–(VI) are a series of schematic illustrations showing the relative location of the head scanning path and the record tracks on the tape for explaining a prior art system of slow-motion playback through such intermittent tape drive.
Figure 3V:
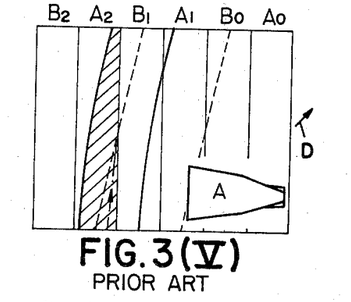

FIGS. 3(I)–3(VI) are schematic illustrations showing the positional relationship between the recording tracks and the scanning path of the reproducing heads in the conventional slow-motion reproduction mode. Recording tracks A0, B0, A1, B1, and so on, are recorded in field units without any guard band therebetween, at a certain skew angle relative to the longitudinal direction of the tape, by a pair of recording heads. Since the amount of tape feed per field is smaller than the width of the video heads, contiguous tracks partly overlap and the width of the recording tracks depends on the tape feed rate. Therefore, the width of each video head is larger than the width of the tracks in the reproduction mode, as shown in FIG. 2. For example, the track width may be 19.4 $\mu$m when the head width is 27 $\mu$m.

FIGS. 3(I) and 3(VI) show the positional relationship between the scanning path and the recording track during still reproduction when the tape is stationary. As shown therein, each head scans the tape at a skew angle shown by the dashed line and in a direction shown by the arrow and scans the tape with a width shown by heavy solid lines. The level of the reproduced signal obtained by head A is indicated on the bottom left-hand side of FIG. 3(I). During still picture reproduction, the hatched portion of track A1 shown in FIG. 3(I) is first reproduced by the A-head. In the latter half of the scanning period, the scanning area of track B0 having a different azimuth angle increases and the output level of the reproduced signal decreases gradually. Subsequently, when the same portion is reproduced by the B-head, the output level is low in the former half scanning period and increases gradually in the latter half scanning period. FIGS. 3(II)–3(V) show a series of scanning operations during periods of intermittent tape transportation in which the tape is fed in the direction shown by arrow D. The tape is accelerated gradually in periods II and III, the normal feed rate is reached in period IV, the tape is decelerated in period V, and still picture reproduction is restored in period VI. During periods II through V, both the A-head and the B-head scan twice while the tape is intermittently fed for a two-frame period. The amount of tape transportation during this operation is for two tracks corresponding to the pitch of the CTL signal.

In reproducing period II, the dotted portion of track B0 is scanned by the B-head, and the output level of the signal therefrom increases gradually. In reproducing period III, the hatched portion of track A1 is scanned by the A-head in a substantially normal reproducing operation. In reproducing period IV, track B1 which is next adjacent to track A1 is scanned by the B-head as in reproducing period V, track A2 is scanned by the A-head, with the output level of the signal therefrom gradually decreasing.

When the tape feed portion of the operation is completed, the still picture reproducing operation shown in FIG. 3(VI) is restored. Throughout reproducing periods I to VI, both heads A and B do not cross any track having a different azimuth angle therefrom, and thus, no noise band appears in the reproduced picture. By appropriately setting the duration for period I or VI in the still picture reproduction mode, slow motion pictures without a noise band can be obtained with any arbitrary rate. With the operation of FIG. 3, however, the output level in the still picture reproduction modes decreases in periods I and VI, resulting disadvantageously in a deteriorated S/N ratio of the reproduced signal.

Figure 4:
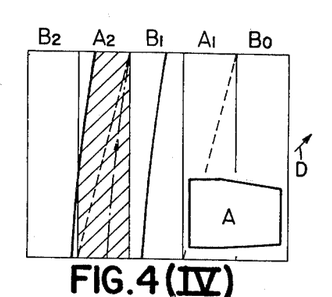
Figure 4I:
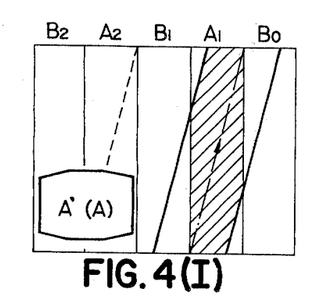
FIGS. 4(I)–(V) are a series of schematic illustrations showing the relative location of the head scanning path and the record tracks for explaining the slow-motion playback operation according to this invention.
Figure 4V:
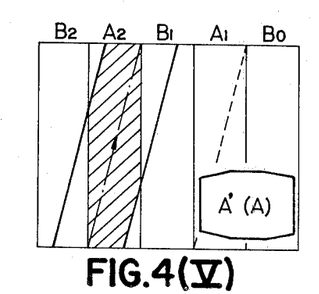
Figure 5:
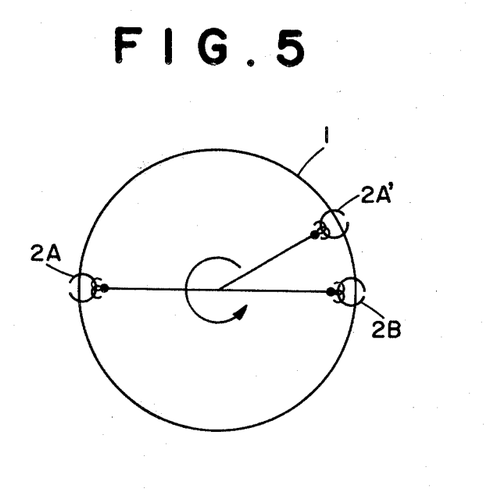
FIG. 5 is a schematic plan view of rotary head drum assembly embodying this invention.

Referring now to FIGS. 4–9, one embodiment of this invention will now be described in which FIG. 4 is a series of illustrations showing the positional relationship between the recording track and the scanning path on the tape in a slow motion reproduction system according to the present invention. In this system, a rotary head drum assembly 1 having three magnetic heads, as shown in FIG. 5, is employed. In particular, head drum assembly 1 is provided with an auxiliary A'-head 2A in addition to the main A-head 2A and the B-head 2B.

Figure 6:
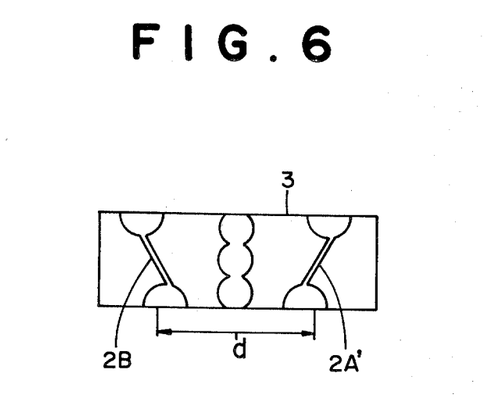
FIG. 6 is a front view of a double gap head assembly.

Preferably, the B-head 2B and the A'-head 2A' are fabricated in a common head chip 3 as shown in FIG. 6, which is a front plan view of a double gap head assembly. The A'-head 2A' has the same azimuth angle as that of the A-head, and the distance d between the B-head and the A'-head is chosen to be a multiple of the length (H-interval) equal to the half circumference of the drum assembly divided by 262.5 (one field).

In this embodiment, three field tape transportation periods II, III and IV are provided between still picture reproducing periods I and V, as shown in FIG. 4. The amount of tape transportation in one feed operation is for two tracks, and the phase of the head scanning path substantially coincides with an A-track when the tape stops, as shown in FIGS. 4(I) and 4(V).

During still picture reproduction in period I or V, A-head 2A and A'-head 2A' alternately scan track A1 or A2 respectively. The tape is fed in synchronization with the PG pulse or the head change-over pulse upon completion of the scanning operation by the A'-head, which is located close to head 2B so as to provide a continuous phase relationship. For the field immediately after the tape feed operation has begun, track A1 is scanned by the A-head, as shown in FIG. 4(II) and for the subsequent field, track B1 is scanned by the B-head, as shown in FIG. 4(III). For the next field, track A2 is scanned by the head 2A as shown in FIG. 4(IV). When the tape feed has been completed, track A2 is scanned by A'-head and the A-head alternately, as shown in FIG. 4(V) so as to reproduce a still picture. This series of operations, that is, still picture reproduction (A/A'-heads)→A-head reproduction→B-head reproduction-→A-head reproduction→still picture reproduction (A/A'-heads), is repeated whereby slow motion pictures without a noise band are reproduced. Slow motion playback can thus be achieved at a rate which is equal to the normal playback speed divided by an integer, by setting the duration for each still picture reproduction operation.

By comparing the still picture reproductions in FIGS. 3 and 4 (FIGS. 4(I) and (V), and FIGS. 3(I) and 3(VI)), it can be seen that the system of FIG. 4 provides a much improved output level from each head. Accordingly, the system of FIG. 4 embodying the present invention provides a better S/N ratio whereby higher quality slow motion pictures can be obtained as compared with those obtained from the conventional system.

Figure 7:
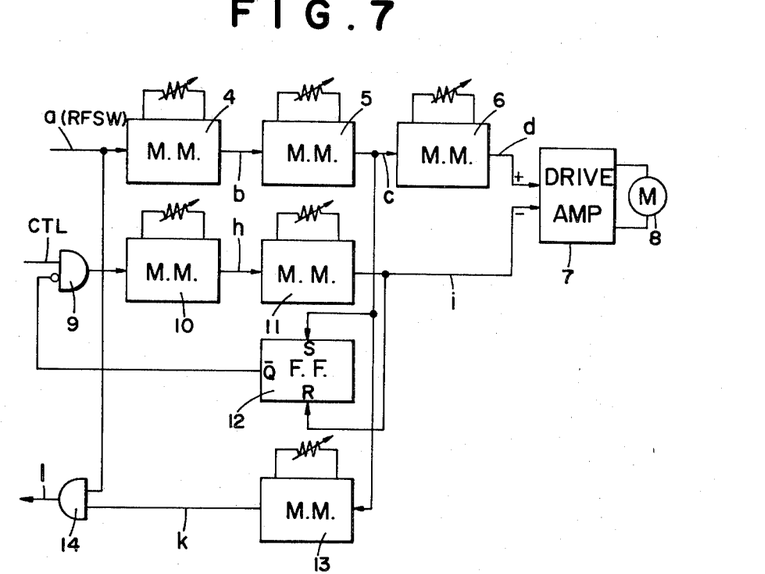
FIG. 7 is a block diagram of a capstan motor intermittent drive control circuit according to one embodiment of the present invention.
Figure 8:
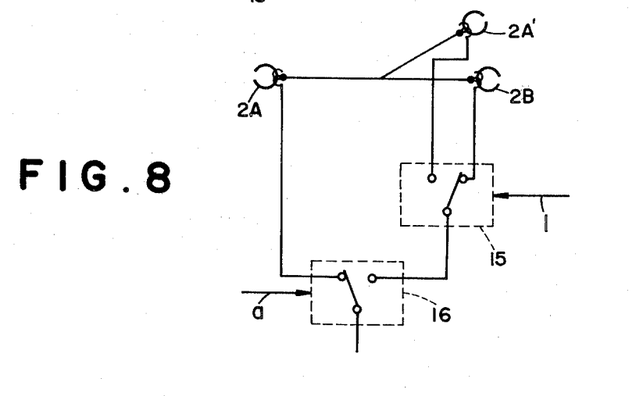
FIG. 8 is a circuit diagram of a head switching circuit according to one embodiment of this invention.

Referring now to FIG. 7, there is shown a block diagram of a capstan motor intermittent drive control circuit according to an embodiment of the present invention. FIG. 8 is a circuit diagram of the head switching circuit according to this invention and FIGS. 9A through 9L are time charts showing the waveforms observed for the circuits of FIGS. 7 and 8.

Figure 9A:
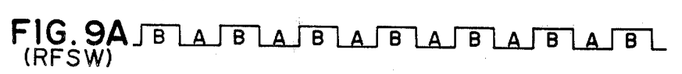
FIGS. 9A–9L are waveform diagrams used for explaining the operation of the circuits of FIGS. 7 and 8.
Figure 9B:
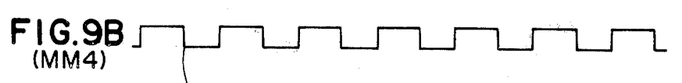
Figure 9C:
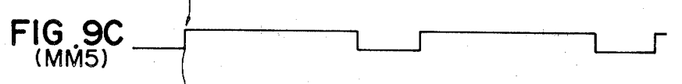

In FIG. 7, a monostable multivibrator 4 is supplied with the head change-over pulses a (RFSW), shown in FIG. 9A, which are produced from the PG pulses. A high signal level of RFSW corresponds to the scanning period of the B-head. The monostable multivibrator 4 is triggered at the leading edges of change-over pulses a and, in response thereto, produces delayed pulses b having a duration longer than one field period, as shown in FIG. 9B. One of the trailing edges of these pulses determines the activation timing of the capstan motor, that is, when the tape is fed upon completion of scanning by the A'-head. The output b of monostable multivibrator 4 is supplied to another monostable multivibrator 5, which is triggered at the trailing edge of pulses b to produce pulses c, as shown in FIG. 9C. The duration of these pulses c, determines the duration for still picture reproduction, and the slow motion playback speed is controlled by changing the pulse width thereof.

Figure 9D:
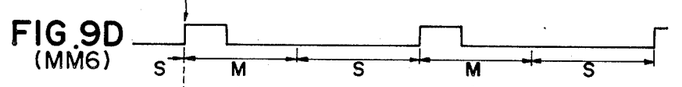
Figure 9E:
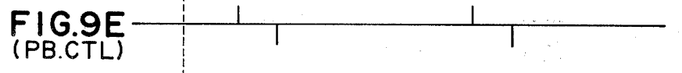
Figure 9F:
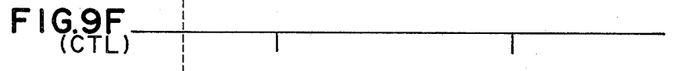

The output c of monostable multivibrator 5 is supplied to another monostable multivibrator 6, which produces pulses d having a predetermined pulse width at the leading edge of pulses c, as shown in FIG. 9D. These pulses d are supplied to a drive amplifier 7, and drive pulses derived from amplifier 7 are supplied to a capstan motor 8. Thus, the tape is fed in the direction shown by arrow D in FIGS. 4(II, III and IV). The tape is actually fed for about three field periods, as shown by the period M, in FIG. 9D, which is longer than the duration of a drive pulse, due to the inertia of the tape drive mechanism. The tape is kept stationary in period S, shown in FIG. 9D, until the next drive pulse is supplied to the motor. During the tape feed period M, the CTL reproduction signal shown in FIG. 9E is obtained by the CTL head, and the CTL pulses (shown in FIG. 9F) derived from the CTL reproduction signal are used to control the tape stop position, as will be described later.

Figure 9G:
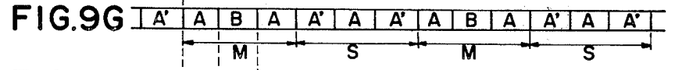
Figure 9H:
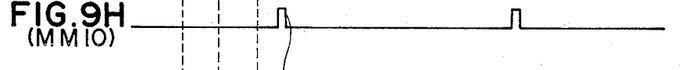
Figure 9I:
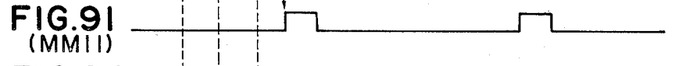

In this manner, reproduction close to the normal playback speed is carried out using the A-head, the B-head and again the A-head, during the tape feed period M, and still picture reproduction is carried out using the A'-head, the A-head and again the A'-head, during the tape stationary period S, as shown in the time chart of FIG. 9G. The reproduction rate shown in FIG. 9G is reduced to $\frac{1}{3}$ its normal rate, since the tape is fed for two tracks (two fields) a six field period (M+S).

The tape stop position is determined from the timing of the CTL pulses, so that the A-track can be scanned to reproduce a still picture in the positional relationship shown in FIG. 4(V).

In FIG. 7, the CTL pulses (shown in FIG. 9F) are supplied through an inhibit gate 9 to a monostable multivibrator 10. The gate 9 at such time is in its conductive state, since a flip-flop 12, as will hereinafter be described, has been set at the leading edge of output signal c from monostable multivibrator 5. The monostable multivibrator 10 produces tracking control pulses h, shown in FIG. 9H, and the tape stop position can be controlled by adjusting the duration of each pulse h.

Figure 9J:
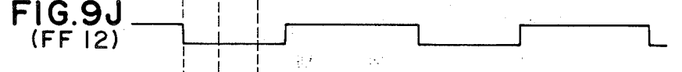
Figure 9K:
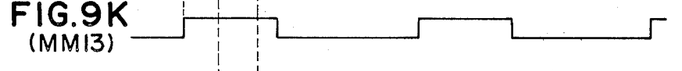
Figure 9L:
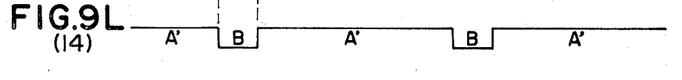

The output of monostable multivibrator 10 is supplied to another monostable multivibrator 11, which produces a braking pulse i (FIG. 9I) having a predetermined pulse width. The braking pulse i is supplied to the negative input of drive amplifier 7 so as to produce a reverse drive voltage supplied to capstan motor 8, and the motor produces a braking force to stop the tape. The aforementioned flip-flop 12 is set by signal c from monostable multivibrator 5 and is reset by braking pulse i from monostable multivibrator 11, and produces an output Q, as shown in FIG. 9J. When the output Q is at a high level, inhibit gate 9 is closed so that the CTL pulse is not supplied to monostable multivibrator 10. Accordingly, once braking is activated, the brake control circuit consisting of monostable multivibrators 10 and 11 does not operate until flip-flop 12 is set again.

The output c of monostable multivibrator 5 is also supplied to a monostable multivibrator 13, which produces output pulses k (FIG. 9K) having a predetermined duration starting at leading edges of the input pulses c. This pulse duration substantially represents the tape transportation period. The output of monostable multivibrator 13 is supplied to an AND gate 14, which is also supplied with the head change-over signal a, and which produces second head change-over pulses l for the switching of the A'-head the and B-head.

The head change-over pulses l are supplied to a switching circuit 15 in FIG. 8, so that B-head 2B is selected during the tape transportation period M. Another switching circuit 16 is supplied with head change-over pulses a, shown in FIG. 9A, and the heads are switched from the A-head to the B-head and again to the A-head sequentially during the tape transportation period, as shown in FIG. 9G. On the other hand, during the tape stationary period, the switching circuit 15 is operated so that A'-head 2A' is selected, and thus the A'-head and A-head are selected alternately, as shown in FIG. 9G.

In the foregoing embodiment, the tape transportation period is established so that the tape is moved for one frame (two tracks) in a three field period. However, the tape transportation period and the moving pitch may be n fields and m frames, respectively (where n and m represent integers).

Having described a specific preferred embodiment of the invention with reference to the accompanying drawings, it is to be understood that the invention is not limited to that precise embodiment, and that various changes and modifications may be effected therein by one skilled in the art without departing from the scope or spirit of the invention as defined in the appended claims.

What is claimed is:

1. An apparatus for reproducing video signals recorded on tracks which are obliquely formed on a tape, comprising:
   at least two main rotary heads having different azimuth angles with respect to each other for scanning said tracks;
   an auxiliary rotary head having the same azimuth angle as that of one of said main rotary heads, said auxiliary rotary head being disposed to substantially scan the same track as that scanned by said one of the main rotary heads;
   motor means for driving said tape;
   tape driving means for controlling said motor means to intermittently drive the tape during a slow motion reproduction mode by an amount corresponding to a predetermined number of said tracks during each of a plurality of predetermined time intervals; and
   head control means for controlling the operation of said main rotary heads and said auxiliary rotary head such that said video signals are reproduced by said one of the main rotary heads and said auxiliary rotary head having the same azimuth angle when said tape is stopped, and the video signals are reproduced by said main rotary heads during movement of said tape.

2. An apparatus according to claim 1, in which said tape driving means includes a drive pulse generating circuit for generating a motor drive pulse in response to a head switching pulse, and a brake pulse generating circuit for generating a motor brake pulse in response to a control signal reproduced from said tape, said tape being intermittently driven by alternately supplying said motor drive pulse and said motor brake pulse to said motor means.

3. An apparatus according to claim 2, in which said drive pulse generating circuit includes first monostable multivibrator means for determining the interval of said drive pulse in accordance with a slow-motion playback ratio.

4. An apparatus according to claim 3, in which said head control means includes a first switch circuit which switches one of the outputs from said other of said main rotary heads and said auxiliary rotary head in response to a switching signal, and a second switch circuit which switches one of the outputs of said one of said main rotary heads and said first switch circuit in response to said head switching pulse.

5. An apparatus for reproducing video signals recorded on tracks which are obliquely formed on a tape, comprising:
   at least two main rotary heads having different azimuth angles with respect to each other for scanning said tracks;
   an auxiliary rotary head having the same azimuth angle as that of one of said main rotary heads, said auxiliary rotary head being disposed to substantially scan the same track as that scanned by said one of the main rotary heads;
   a tape capstan motor for driving said tape;
   tape driving means for controlling said tape capstan motor to intermittently drive the tape by an amount corresponding to a predetermined number of said tracks during each of a plurality of predetermined time intervals, said tape driving means including a drive pulse generating circuit for generating a motor drive pulse in response to a head switching pulse and having first monostable multivibrator means for determining the interval of said drive pulse in accordance with a slow-motion playback ratio, a brake pulse generating circuit for generating a motor brake pulse in response to a control signal reproduced from said tape, said tape being intermittently driven by alternately supplying said motor drive pulse and said motor brake pulse to said tape capstan motor, and flip-flop means responsive to said first monostable multivibrator means and to said motor brake pulse for producing a gate signal; and
   gate means receiving said control signal and said gate signal for feeding said control signal to said brake pulse generating circuit during each drive pulse interval; and
   head control means for controlling the operation of said main rotary heads and said auxiliary rotary head such that said video signals are reproduced by said one of the main rotary heads and said auxiliary rotary head when said tape is stopped, and the video signals are reproduced by said main rotary heads during movement of said tape.

6. An apparatus according to claim 5, in which said brake pulse generating circuit includes second monostable multivibrator means responsive to said control signal from said gate means for producing said motor brake pulse with a predetermined pulse width.

7. An apparatus for reproducing video signals recorded on tracks which are obliquely formed on a tape, comprising:
   at least two main rotary heads having different azimuth angles with respect to each other for scanning said tracks;
   an auxiliary rotary head having the same azimuth angle as that of one of said main rotary heads, said auxiliary rotary head being disposed to substantially scan the same track as that scanned by said one of the main rotary heads;
   a tape capstan motor for driving said tape;
   tape driving means for controlling said tape capstan motor to intermittently drive the tape by an amount corresponding to a predetermined number of said tracks during each of a plurality of predetermined time intervals, said tape driving means including a drive pulse generating circuit for generating a motor drive pulse in response to a head switching pulse and having first monostable multivibrator means for determining the interval of said drive pulse in accordance with a slow-motion playback ratio, and a brake pulse generating circuit for generating a motor brake pulse in response to a control signal reproduced from said tape, said tape being intermittently driven by alternately supplying said motor drive pulse and said motor brake pulse to said tape capstan motor; and head control means for controlling the operation of said main rotary heads and said auxiliary rotary head such that said video signals are reproduced by said one of the main rotary heads and said auxiliary rotary head when said tape is stopped, and the video signals are reproduced by said main rotary heads during movement of said tape, said head control means including a first switch circuit which switches one of the outputs from said other of said main rotary heads and said auxiliary rotary head in response to a switching signal, a second switch circuit which switches one of the outputs of said one of said main rotary heads and said first switch circuit in response to said head switching pulse, a switching signal generating circuit having third monostable multi-vibrator means connected to said drive pulse generating circuit for generating a signal indicative of movement of the tape, and second gate means receiving said indicative signal and said head switching pulse for producing said switching signal indicating a duration wherein said other of said main rotary heads should be switched.

* * * * *